United States Patent [19]

Chappell et al.

[11] Patent Number: 5,181,600
[45] Date of Patent: Jan. 26, 1993

[54] CONVEYOR STRUCTURE

[76] Inventors: Ian C. Chappell, 23 The Grove, Austinmer, New South Wales 2515; Peter W. G. Matusch; Dagobert R. Matusch, both of 34 Windang Road, Primbee, New South Wales 2504, all of Australia

[21] Appl. No.: 721,631
[22] PCT Filed: Jan. 23, 1990
[86] PCT No.: PCT/AU90/00021
§ 371 Date: Sep. 23, 1991
§ 102(e) Date: Sep. 23, 1991
[87] PCT Pub. No.: WO90/08717
PCT Pub. Date: Aug. 9, 1990

[30] Foreign Application Priority Data

Jan. 24, 1989 [AU] Australia .............................. PJ2404
Jul. 19, 1989 [AU] Australia .............................. PJ5384

[51] Int. Cl.⁵ .............................................. B65G 21/14
[52] U.S. Cl. .................................... 198/812; 198/309
[58] Field of Search ................. 198/812, 861.1, 861.2, 198/309; 193/35 TE

[56] References Cited
U.S. PATENT DOCUMENTS
4,860,878 8/1989 Mraz et al. .

*Primary Examiner*—Joseph E. Valenza
*Attorney, Agent, or Firm*—Cushman, Darby & Cushman

[57] ABSTRACT

A conveyor structure (1.20) is disclosed that is capable of being retracted concertina fashion for transport on a trailer (42) between sites of operation. The structure comprises a plurality of H-frames each comprised of rigid supports (2A, 2B or 21,22) joined by a cross-member (3) which supports rollers (3A-D,30) upon which the conveyor belt (4) travels. Extensible links (6), and cross-braces (25,26) maintain the longitudinal and lateral rigidity of structure.

12 Claims, 7 Drawing Sheets

CONVEYOR STRUCTURE

The present invention relates to structural supports for conveyor belts and, in particular, discloses an expandable conveyor structure that can be transported between sites of operation in a retracted configuration.

In order to transport a conventional conveyor structure, it is necessary for the structure to be dismantled by way of separating the belt from the frame and then separating the frame into its constituent pieces. The various pieces of the dismantled structure are then transported. Once the new site of operation is reached, the structure is then reassembled.

Such a conveyor system is used, for example, in coal mining where the conveyor is used to convey coal within the mine from the coal face to a local storage point or the start of a fixed conveyor line. It is therefore required that as the coal face moves, whilst mining progresses, the conveyor structure must move with the coal face and hence transportability is necessary. Typically, it takes seven men fourteen hours to operationally relocate a thirty meter section of the prior art conveyor structure. Also, because of the dismantling and modular construction of a conventional conveyor structure, realignment of the relocated structure is required prior to use.

It is an object of the present invention to substantially overcome, or ameliorate, the abovementioned difficulties through provision of a concertina like conveyor structure that can be compressed or retracted and thereby transported without substantial dismantling between sites of operation.

In accordance with the present invention there is disclosed a conveyor structure comprising:

a set of H-frames each comprising two substantially parallel rigid supports of equal length, and a cross-member arranged to support a conveyor belt, said H-frames being pivotally joined together in zig-zag configuration with corresponding ends of each of said rigid supports being pivotally connected whereby said set of frames is able to extend and retract in concertina fashion between a compact transport configuration in which the rigid supports of adjacent frames are substantially parallel and an extended zig-zag support configuration, the angular separation between adjacent frames being limited by a plurality of links extending between said frames.

A conveyor structure of the preferred embodiment of the present invention is a thirty meter length of conveyor and is capable of being operationally relocated over a period of three hours by three men.

Two embodiments able to achieve the above result will now be described with reference to the drawings in which.

Figure 4:
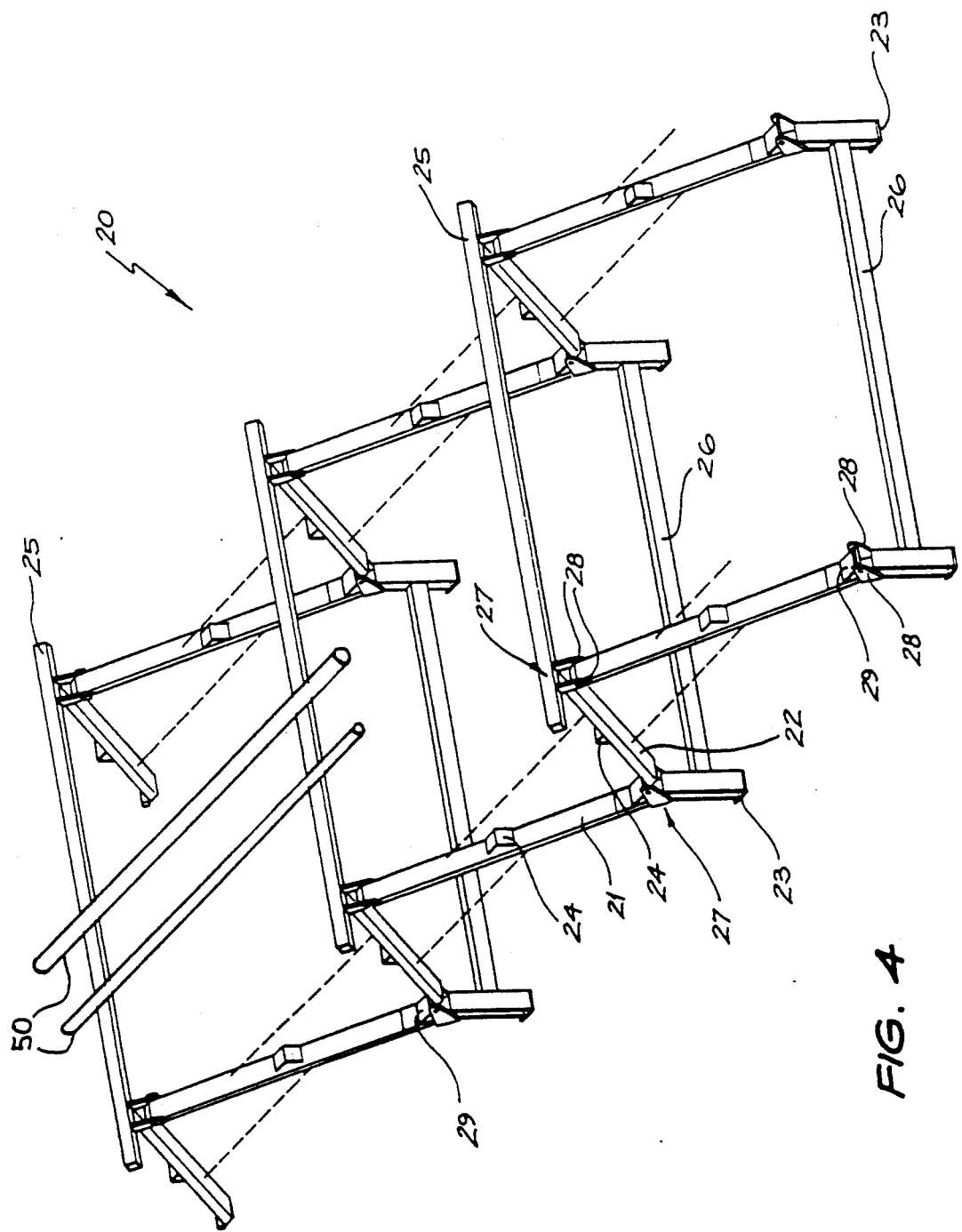
FIG. 4 illustrates a perspective view of the second embodiment in its operative configuration.
Figure 6:
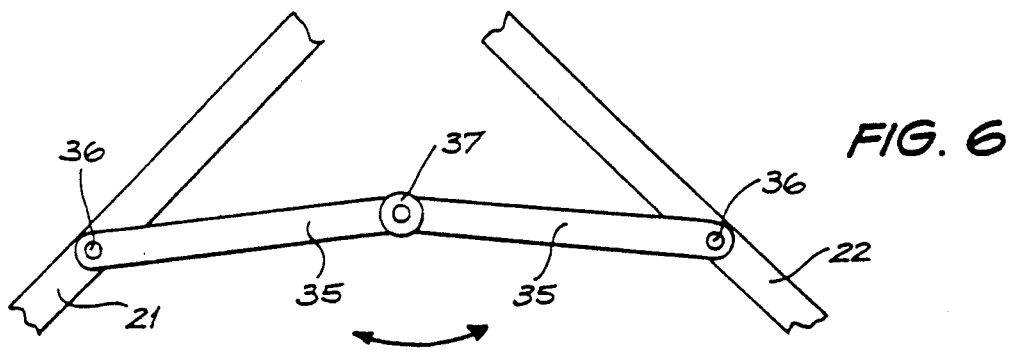
Figure 7:
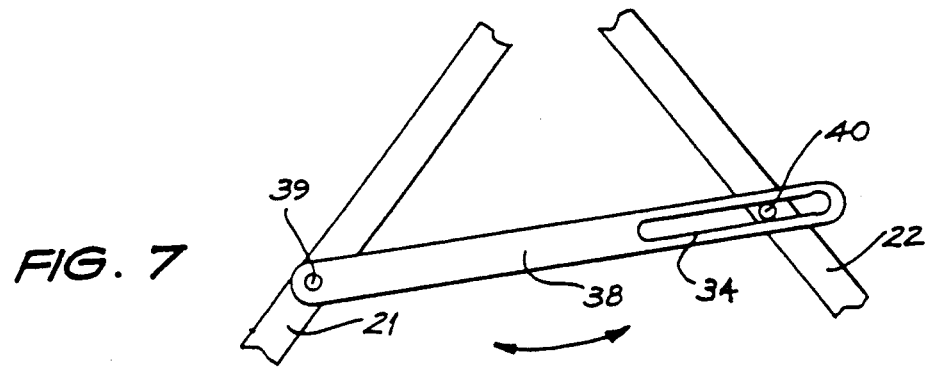
Figure 8:
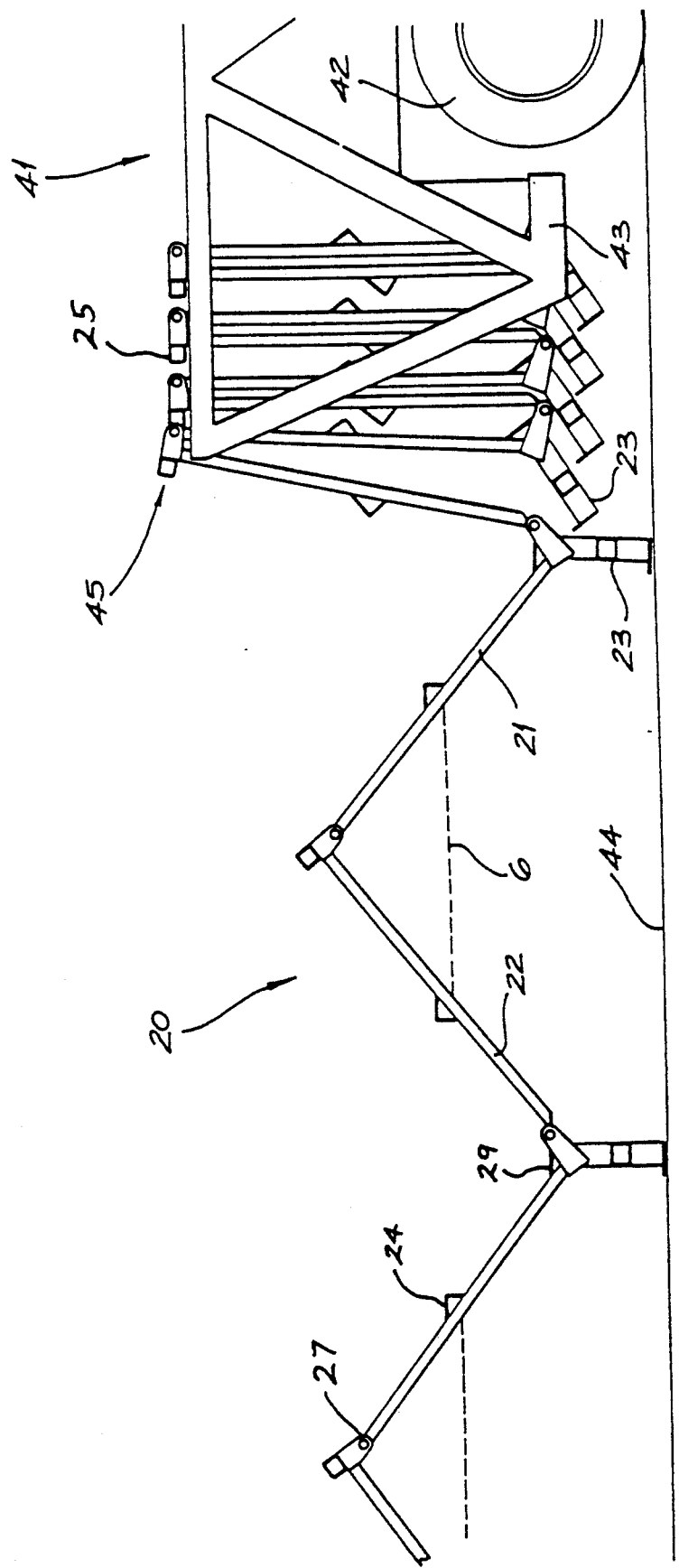
Figure 9:
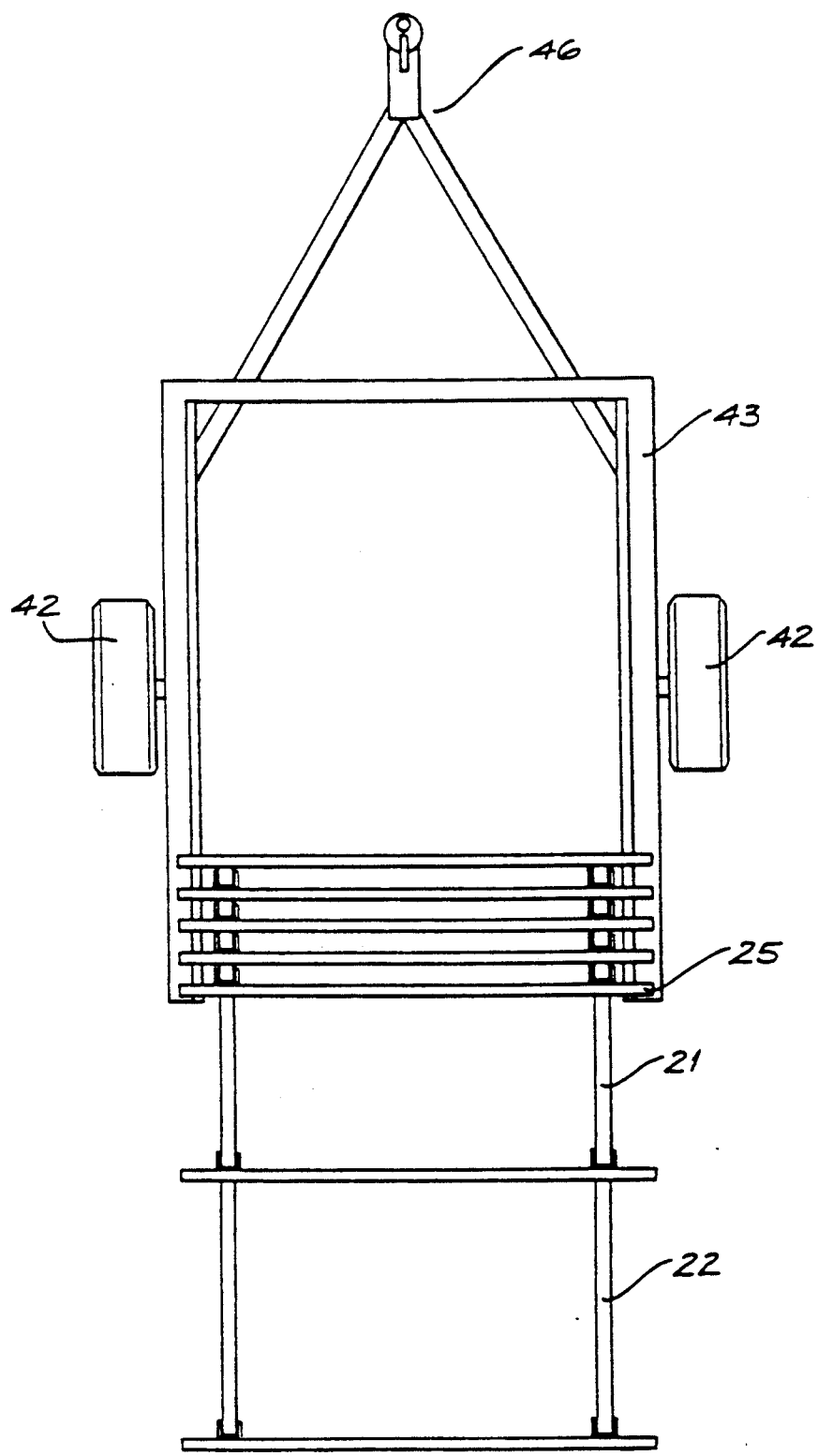

FIGS. 6 and 7 each illustrate alternative brace arrangements that can be used with either embodiment;

FIG. 8 is a side elevation of the loading/unloading of the conveyor structure of FIG. 4 onto a trailer especially designed for the purpose; and FIG. 9 is a plan view of the apparatus of FIG. 8.

Figure 1:
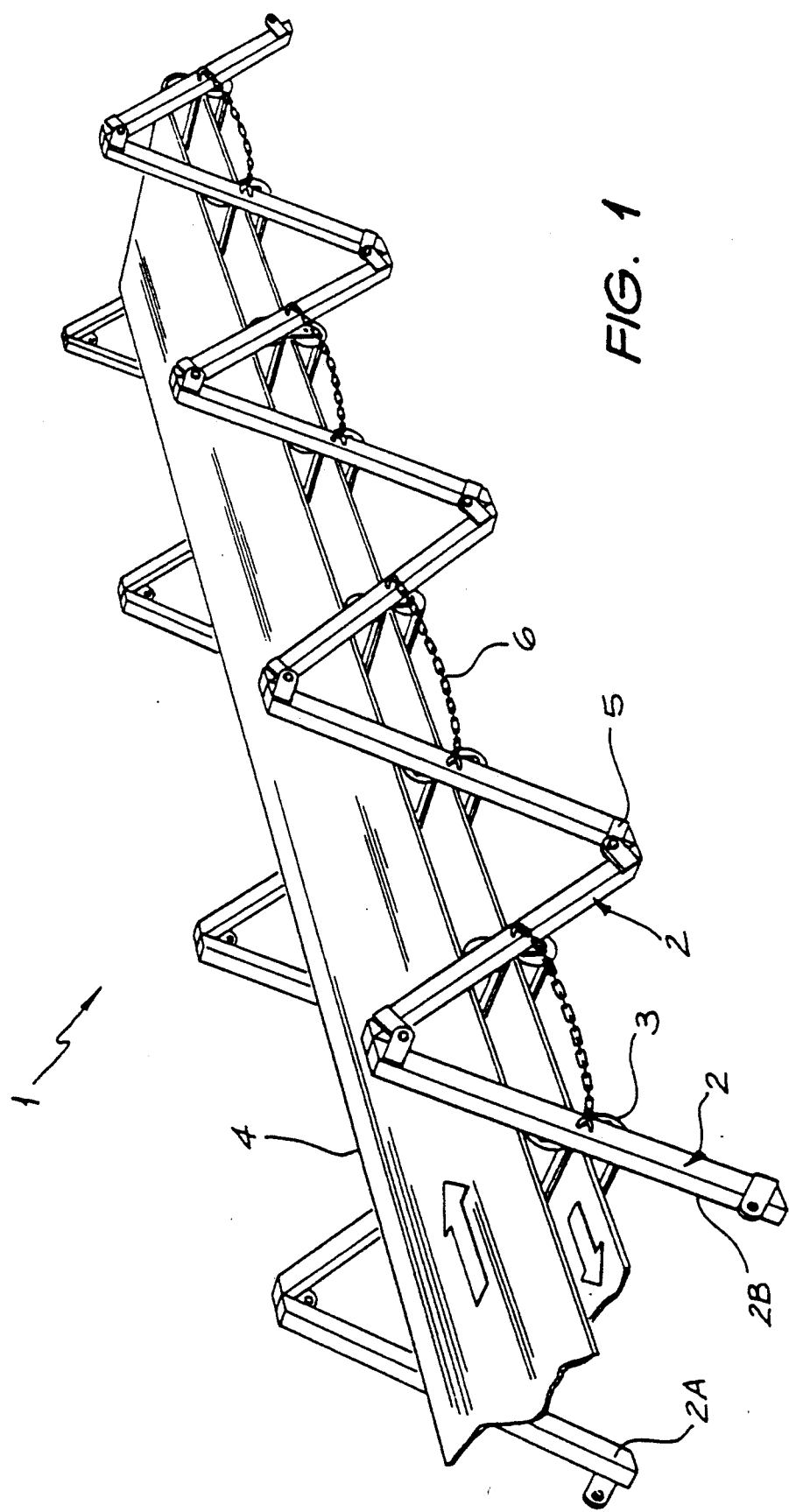
FIG. 1 illustrates a perspective view of the first embodiment.

As seen in FIG. 1, the conveyor structure 1 comprises a plurality of H-frames 2 each formed from rigid support members 2A and 2B of equal length joined approximately at their mid points by a cross-member 3. The cross-member 3 carries rollers for the support for the upper and lower runs of the conveyor belt 4 residing thereon. The H-frames 2 are joined together by hinged connections 5 at each end of the supports 2A and 2B. Each pair of H-frames 2 is connected by a mild steel chain 6 that provides rigidity when the structure 1 is in its operative extended zig-zag configuration illustrated in FIG. 1. The supports 2 can be manufactured of any rigid material, tubular steel being a good example.

Figure 2:
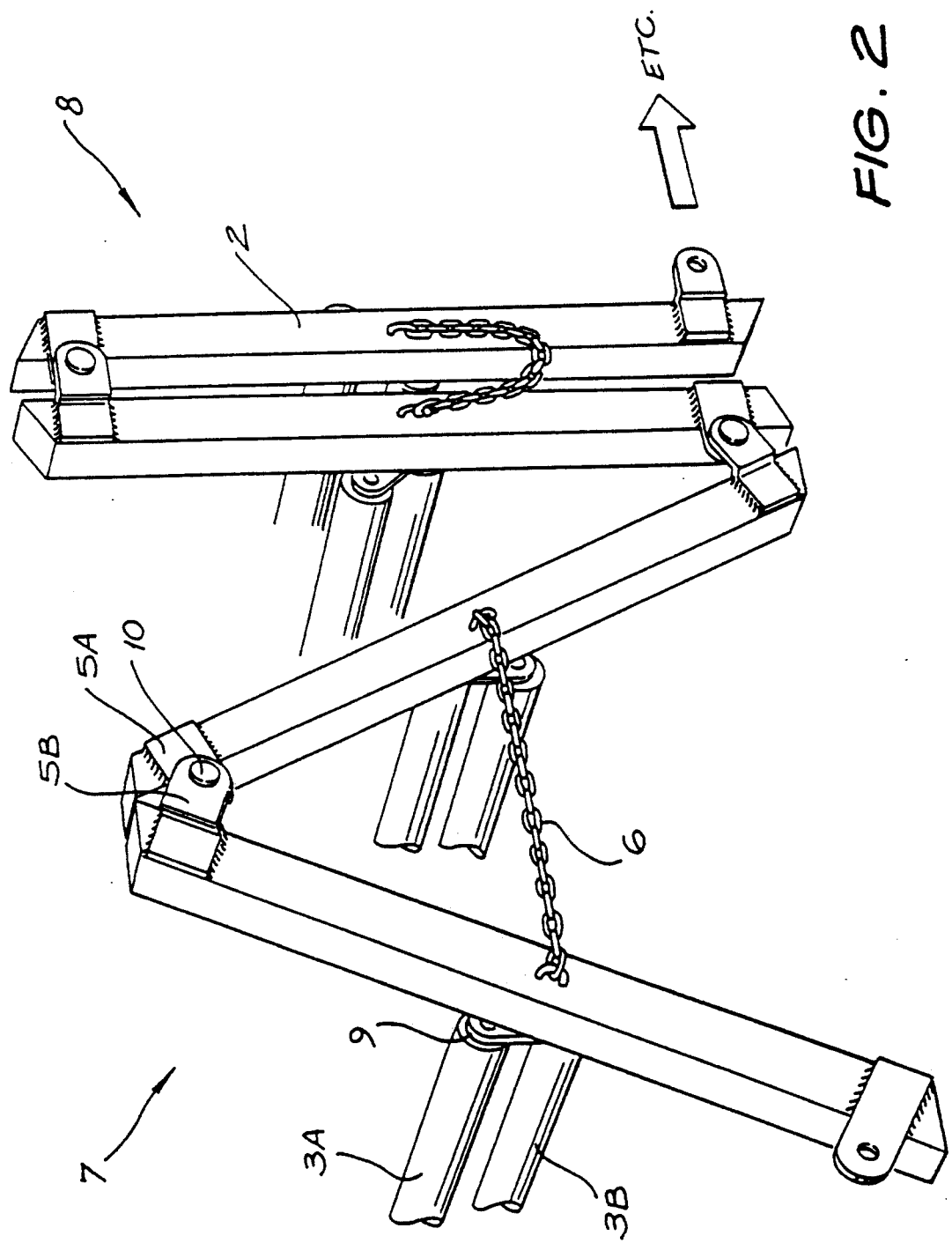
FIG. 2 illustrates a section of the structure illustrated in FIG. 1 showing the H-frames in each of their operative and transportable configurations.
Figure 3:
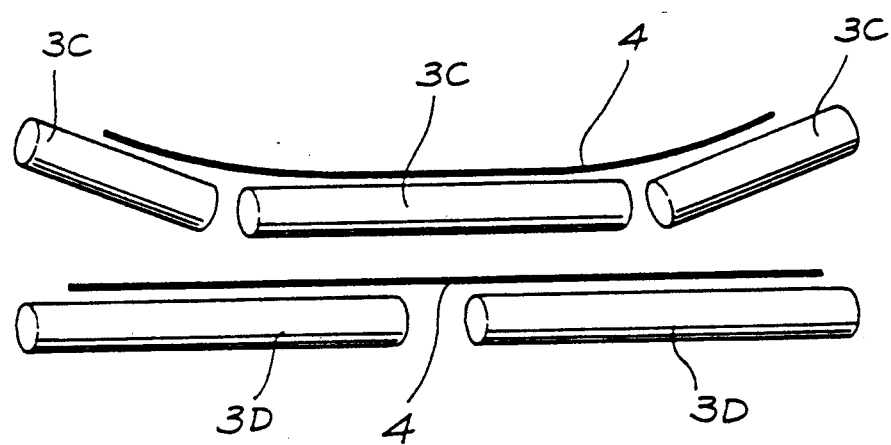
FIG. 3 illustrates an alternative roller configuration to support the conveyor belt.

Referring now to FIG. 2, the cross-members 3 are shown illustrated as a pair of rollers 3A and 3B attached to the support section by an ear 9. Each of the rollers 3A and 3B has an axle that passes therethrough to allow rotation of the roller and thus transport of the conveyor belt 4. As depicted in FIG. 1, the conveyor belt 4 rests upon the top roller 3A and passes over the lower roller 3B on the return run. FIG. 3 illustrates an alternative arrangement of the rollers in which the bottom roller 3B is replaced by a pair of rollers 30 and the top roller 3A is replaced by an augmented set of rollers 3C to allow support of material conveyed by the belt 4 so as to prevent the material from falling from the sides of the belt 4, due to vibration for example.

Returning now to FIG. 2, the section of the conveyor structure 1 illustrated is shown in both its operative 7 and transportable 8 configurations. The conveyor structure 1 can be seen to be extendable and retractable in concertina fashion by the pivoting of the support sections about the hinged connections 5. As seen in FIG. 2, a hinged connection 5 takes the form of a combination of tabs 5A and 5B extending from the rigid supports 2 with a pin 10 interconnecting the tabs 5A and 5B.

The embodiment illustrated in FIG. 4 is a specific adaptation of the present invention for use in an underground mine. For the sake of clarity, the rollers and conveyor belt are not illustrated. This conveyor structure 20 comprises a plurality of H-frames each formed of two rigid support members 21 or 22 and a cross member 3 (not illustrated). Support 21 has arranged at one end a foot 23 longitudinally offset so that when the structure 20 is in its operative configuration (as illustrated) the zig-zag structure is elevated by the length of each foot 23. Roller supports 24 and 29 are provided on each H-frame. Roller supports 29 are provided to support the rollers for the lower run of the conveyor belt, whilst support 24 supports the roller for the upper run.

The conveyor structure 20 also has an upper cross-brace 25 and a lower cross-brace 26 interconnecting like support members to provide transverse rigidity to the structure 20. Cross-braces 25 and 26 also enhance alignment during setting out and assist in ensuring the belt runs straight. The concertina arrangement also prevents the longitudinal transfer of compressive loads. Hinges 27 are located in the longitudinal plane of the join between support members 21 and 22. Each hinge 27 is formed by a pair of ears and a pin (not illustrated) which extends between the ears.

Figure 5:
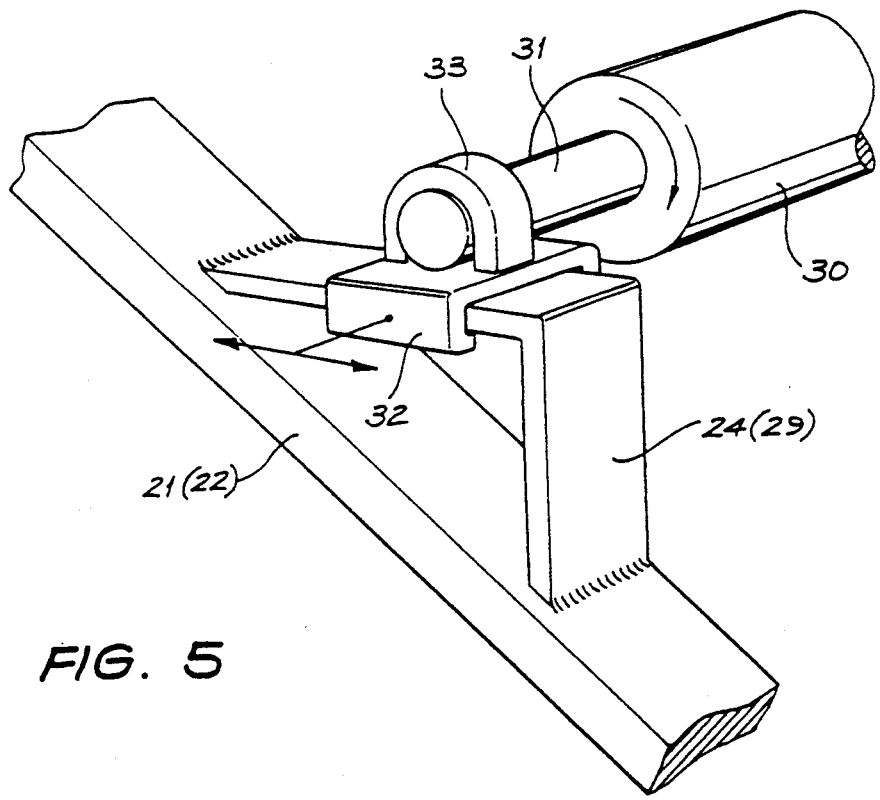
FIG. 5 illustrates the support for the rollers in the second embodiment.

As illustrated in FIG. 5, the roller support 24 for the support members 21,22 supports a roller 30 rotatably mounted on a dead shaft 31. The shaft 31 is fixed to an adjustable slide 32 by a bracket 33. The adjustable slide 32 is able to be moved along the roller support 24 as indicated in FIG. 5. The fixing of the shaft 31 to the support 24 is made adjustable so as to allow for the "training" of the conveyor belt. The "training" ensures that the belt is centred and correctly aligned on the rollers 30. The provision of adjustable slide 32 also allows for the belt to be correctly set up notwithstanding variations in terrain.

Illustrated in FIGS. 6 and 7 are partially extended link alternatives to the chain 6 used to provide longitudinal rigidity of the conveyor structure 1 or 20 of FIGS. 1 or 4 when in the operational configuration. FIG. 6 shows two rigid links 35 each connected by pivots 36 to the corresponding support members 21,22. The links 35 are centrally pivoted together at 37. FIG. 7 shows a pivoted link 38 pivotally connected to support member 21 at 39. The link 38 is able to slide relative to support member 22 by means of a bulbous pin 40 retained in an elongate slot 34. It will be apparent to those skilled in the art that in each of the alternatives depicted in FIGS. 6 and 7, support members 21 and 22 are extendable to a fixed angle therebetween and can be folded without dismantling.

The loading and unloading of the conveyor structure 20 is illustrated in FIG. 8. The structure 20 can be loaded and unloaded onto a trailer 41 (also illustrated in FIG. 9) which has wheels 42 with hydraulically adjustable axles so that the clearance of the trailer chassis 43 above ground level 44 is adjustable.

As seen in FIG. 4, the upper cross brace 25 extends longitudinally beyond the support members 21 and 22. The conveyor structure 20 is supported in the trailer 41 by the extended end portions of the upper cross brace 25 which rest (or slide) on the top of the trailer chassis 43 as illustrated in FIG. 8. During loading or unloading, offset hinge connections 27 and engagement of the foot 23 with the ground surface hold the cross brace 25 of the frame being (un)loaded, clear of the top of the chassis as depicted at 45 in FIG. 8. This clearance is maintained until the next frame is lifted clear. Frames loaded onto the trailer can be pulled towards the yoke 46 illustrated in FIG. 9 by a winch (not illustrated) or other conventional means for example. During unloading the movement of the trailer over the ground is sufficient to disengage the frames from the trailer.

It can be seen from FIG. 9, that the chassis 43 is substantially "tuning fork" or "wishbone" shape so that the folded structure can hang by cross braces 25 in the chassis interior in order to reduce the clearance height at which the trailer is required to operate. This is particularly important when considering underground mines as the ceiling height is generally limited to between 2.0 and 2.3 meters. The embodiment illustrated in FIG. 8 when loaded in the trailer 41 has a total clearance height of 2.2 meters.

It will be apparent to those skilled in the art that very little human effort is required to load and unload the conveyor structure 20 from the trailer 41. Loading is achieved by slowly reversing the trailer onto the structure and pulling the frames forward. As successive frames fold, the feet 23 of the last folded frame "kick" against the feet 23 of the frame still in its operative position. This lifts that frame from the ground and raises the next upper cross brace 25 into position for capture by the top rail of the chassis 43, as earlier described.

For unloading, the end frame is placed on the ground and then the trailer 41 is driven in the direction of the desired structure. The frames of the structure then unfold from the end of the trailer 41 to be held by chains 6 in the operative configuration.

As also seen in FIG. 8, when in the folded configuration on the trailer, roller supports 29 and the rollers residing thereon (not illustrated) ensure a minimum clearance between adjacent folded support members 21 and 22. This prevents pinch points from occurring that can injure the fingers of workers loading and unloading the frames. This can eliminate the requirement for safety screens as demanded in some jurisdictions. Also, the roller supports 24 are offset which allows for large diameter rollers to be used. In addition, the available space between adjacent frames ensures that the rollers are free to move on the adjustable slides 32. This allows all the rollers to slide to the same "stop" position on the supports 24, 29 thus providing an initial predetermined "training" position after transportation and deployment.

The provision of rollers on every support frame when combined with cross-braces 25 and 26, enables the conveyor structure 20 to be capable of achieving high load throughput. Specifically the embodiment of FIGS. 4, 5, 8 and 9 can carry 3500 tonne per hour of coal. This is equivalent to about 5000 tonne per hour of heavier minerals such as iron ore or nickel. Whilst throughput is dependent upon the speed of the belt, the maximum speed is determined by the amount of "training" that can be applied to the belt. The "training" accommodated by slides 32 allows the structure 20 to maintain belt alignment and hence operate at high speed. Thus a high throughput is achieved.

It will be apparent to those skilled in the mining arts that the structure of FIGS. 1 or 4 can be readily and rapidly transformed from the expanded, zig-zag, operative configuration to the retracted transport configuration illustrated in the right hand side of FIG. 2 or FIG. 8. This enables the structure to be retracted, loaded onto a trailer, towed to the next site, off loaded from the trailer, and finally be re-expanded back into the operative configuration. This process can be quickly carried out and the length of the support members 2A, 2B are preferably such that even when vertical in the trailer there is clearance below the mine roof. As no dismantling of the structure, with the exception of removal of the conveyor belt, is necessary for transportation, the time required to effect such a move is much reduced.

The foregoing describes only a number of embodiments of the present invention and other embodiments, obvious to those skilled in the art, can be made thereto without departing from the scope of the present invention.

For example, as illustrated in FIG. 4, conduits 50 for the supply of electricity, water compressed air and like services can be temporarily supported by the H-frames when in the extended configuration. Also the chains 6 can be replaced by cables if desired.

We claim:

1. A conveyor structure comprising:
a set of H-frames each comprising two substantially parallel rigid supports of equal length, and a cross-member arranged to support a conveyor belt, said H-frames being pivotally joined together in zig-zag configuration with corresponding ends of each of said rigid supports being pivotally connected, the pivot joining of said H-frames comprising a pivot axis displaced from the plane of each joined H-frame, wherein said set of frames is able to extend and retract in concertina fashion between a compact transport configuration in which the rigid supports of adjacent frames are substantially parallel and an extended zig-zag support configuration, the angular separation between adjacent frames being limited by a plurality of links extending between said frames.

2. A conveyor structure as claimed in claim 1 wherein said cross members are mounted to said rigid supports using an adjustable slide on a bracket to provide for training of said conveyor belt.

3. A conveyor structure comprising:

a set of H-frames each comprising two substantially parallel rigid supports of equal length, and a cross-member arranged to support a conveyor belt, said H-frames being pivotally joined together in zig-zag configuration with corresponding ends of each of said rigid supports being pivotally connected wherein each said rigid support is adapted for engagement with a surface over which said structure is operatively arranged and said set of frames is able to extend and retract in concertina fashion between a compact transport configuration in which the rigid supports of adjacent frames are substantially parallel and an extended zig-zag support configuration, the angular separation between adjacent frames being limited by a plurality of links extending between said frames, wherein said cross members are mounted to said rigid supports using an adjustable slide on a bracket to provide for training of said conveyor belt.

4. A conveyor structure as claimed in claim 3, wherein the pivot joining said H-frames comprises a pivot axis displaced from the plane of each joined H-frame.

5. A conveyor structure as claimed in claim 1 or 4, wherein said pivot axis comprises a pin located in a tab extending from said rigid supports.

6. A conveyor structure as claimed in claim 1 or 3, wherein at least some of said cross-members include rollers for the support of said conveyor belt.

7. A conveyor structure as claimed in claim 1 or 3, wherein said links are selected from the group consisting of flexible inextensible links and pivoted rigid links.

8. A conveyor structure as claimed in claim 7 wherein said flexible inextensible links comprise chains.

9. A conveyor structure as claimed in claim 1 or 3, wherein at least some of said H-frames further comprise a rigid cross-brace extending between corresponding ends of said rigid supports.

10. A conveyor structure as claimed in claim 9, wherein alternate ones of said H-frames have said rigid cross-braces extending across the upper ends of said rigid supports and the intermediate one of said H-frames have said rigid cross-braces extending across the lower ends of said rigid supports.

11. A conveyor structure as claimed in claims 10, wherein said upper cross-braces extend longitudinally at each end beyond the rigid supports of said frames and support said frames in a hanging position when loaded onto a trailer having raised side members upon which said upper cross-braces rest.

12. A conveyor structure as claimed in claim 1 or 3, wherein each said cross-member comprises one or more rollers mounted on a shaft, each said shaft being slidingly fixed to a corresponding mounting support carried by each of rigid supports.

* * * * *